3,485,105
GAS SAMPLER APPARATUS
Dwight N. Johnson and Theodore E. Kwast, Anaheim, Calif., assignors to American Meter Company, Philadelphia, Pa., a corporation of Delaware
Filed Sept. 17, 1968, Ser. No. 760,275
Int. Cl. G01n 1/22
U.S. Cl. 73—421.5                 7 Claims

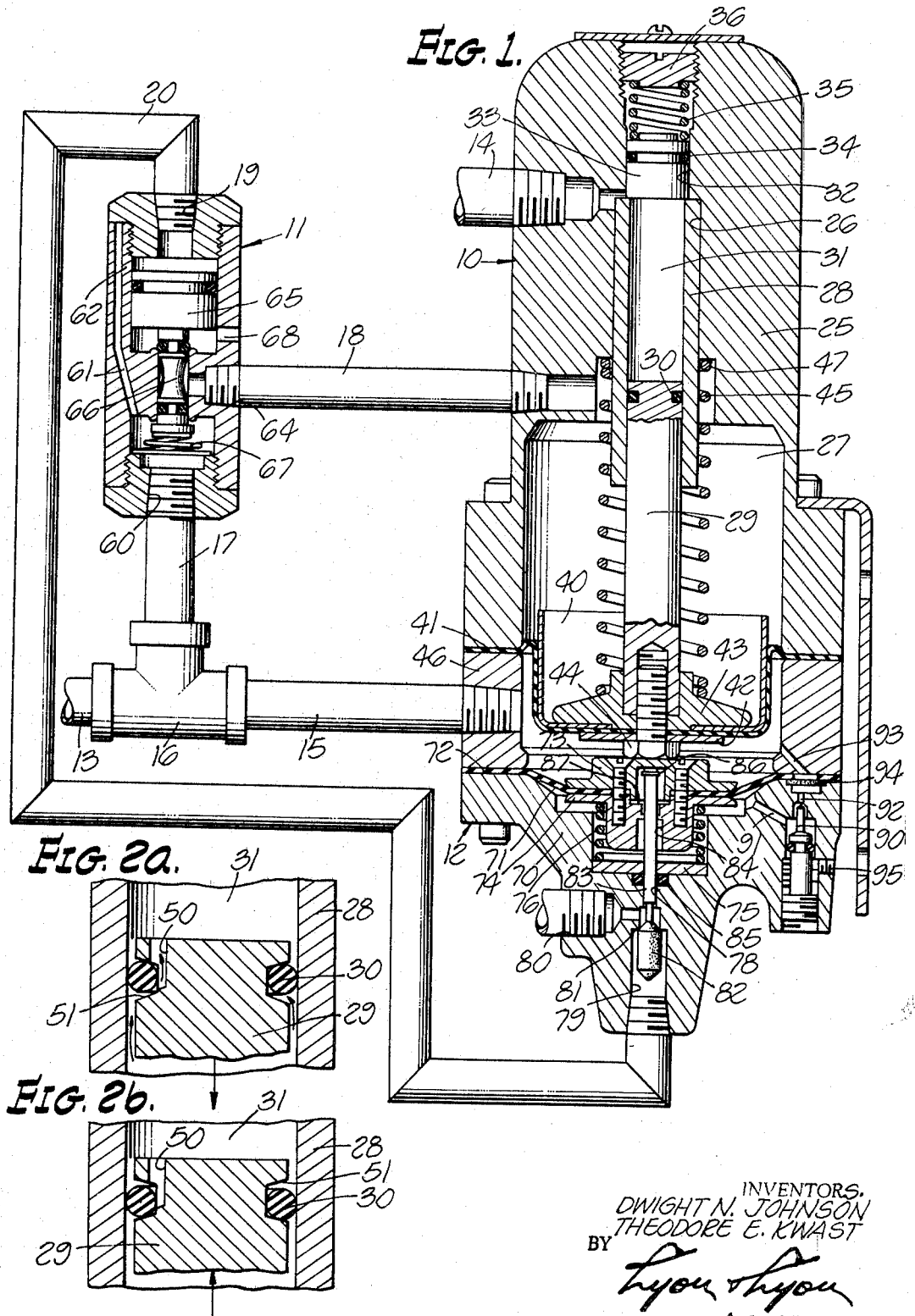

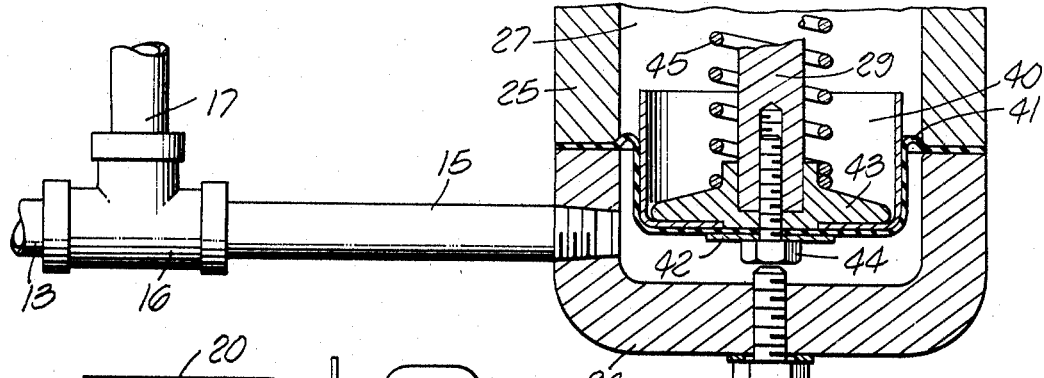
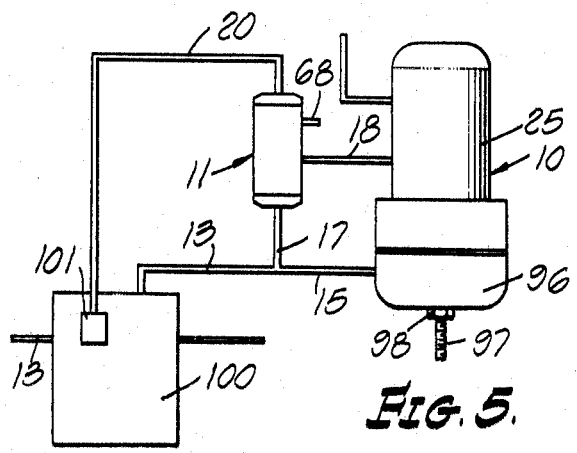
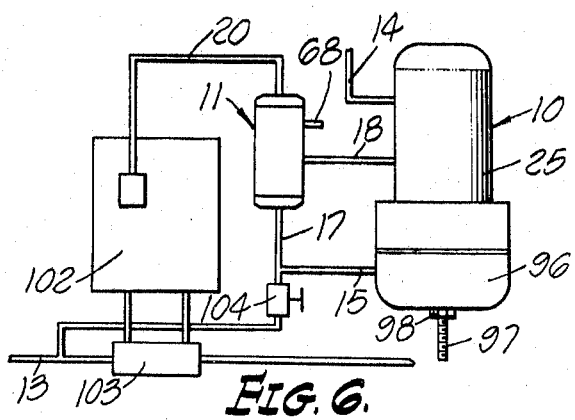
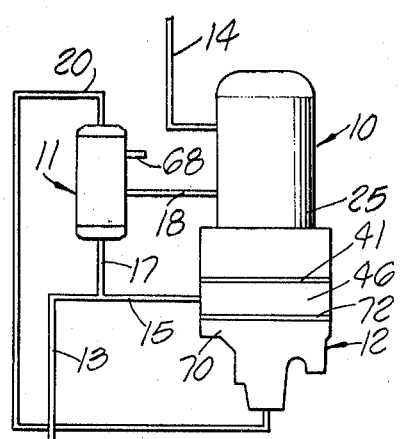
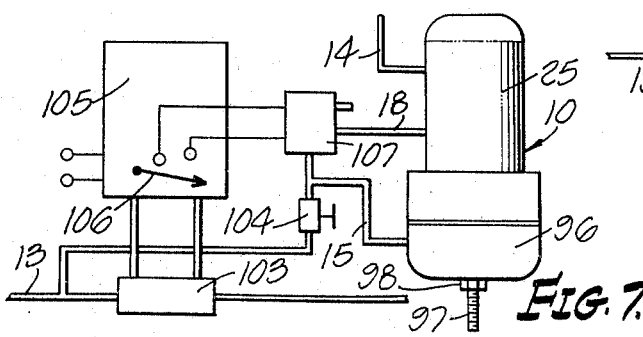

ABSTRACT OF THE DISCLOSURE

Gas sampler apparatus which can inject small quantities of a gas into a storage container having a pressure head either higher or lower than that of the gas source. Numerous injected volumes of gas can be collected in the container to obtain a representative sample of the gas source. Samples may be taken either related to a fixed time interval or as a function proportional to gas stream mass flow. The apparatus disclosed includes a gas sampler pump operated in conjunction with a conventional pilot booster valve. The pump employs a zero differential check valve in the form of an O-ring on an injector piston, and a discharge poppet valve which enables a constant injected volume to be maintained regardless of back pressure variation in the storage vessel. A timing head is disclosed coupled with the pump and triggers the booster valve by a dash-pot actuation of a poppet thereof. Alternatively, the booster valve can be externally triggered by a pneumatic signal, or a solenoid valve may be used to trigger the sampler apparatus in response to an electrical triggering signal.

---

This invention relates to gas sampling, and more particularly to gas sampler pump apparatus for injecting small quantities of a gas into a storage vessel having a pressure head different from that of the gas source being sampled.

It frequently is desirable to sample gas from a gas source, such as for the purpose of collecting samples of natural gas for analyzing average B.t.u. content. Conventional methods of gas sampling are relatively expensive, and frequently have the disadvantage that the various samples injected into the storage vessel are not of equal volume, because of the fluctuating pressure of the source and because of the pressure build-up in the storage vessel.

Accordingly, it is a principal object of the present invention to provide an improved apparatus for use in gas sampling.

An additional object of this invention is to provide an improved gas sampling apparatus for injecting small quantities of gas of substantially equal volumes into a pressure vessel having a pressure head which may be different from that of the gas source.

A further object of this invention is to provide a novel gas sampler apparatus having built-in timing of operation thereof and which requires no external triggering mechanism.

These and other objects and features of the present invention will become better understood through a consideration of the following description taken inconjunction with the drawings in which:

FIGURE 1 is a cross-sectional view of gas sampler apparatus according to the present invention including a gas sampler pump, booster valve and timing head;

FIGURES 2a and 2b are fragmentary cross-sectional views illustrating the operation of a zero differential check valve of the sampler pump;

FIGURE 3 is a schematic representation of a gas sampling application of the apparatus of FIGURE 1;

FIGURE 4 is a fragmentary cross-sectional view illustrating a modification of the apparatus shown in FIGURE 1; and FIGURES 5 through 7 are schematic representations of gas sampling applications of the modified apparatus shown in FIGURE 4.

As noted earlier, the gas sampler apparatus of the present invention enables small quantities of gas to be injected into a storage container or vessel having a pressure head different from that of the gas source. For example, it may be desired to provide discrete gas samples up to one hundred p.s.i. from a twenty p.s.i. source. A principal use of the apparatus lies in the collection of numerous injected volumes of gas into the storage vessel to obtain a representative sample of the gas source. Typical applications include collecting samples of natural gas for analyzing average B.t.u. content. The sampled source is a gas stream in which the B.t.u. content is fluctuating. Samples of the gas stream are injected into a storage vessel by periodically activating the apparatus in a manner either related to a fixed time interval or as a function proportional to gas stream mass flow. The pump apparatus described herein typically may have a delivery pressure of one hundred p.s.i. and a sample volume of 0.3 cubic inch per stroke.

Turning now to the drawings, FIGURE 1 illustrates apparatus according to the present invention including a gas sampler pump 10, a conventional air pilot booster valve 11 and a timing head 12. Briefly, the pump 10 serves to inject gas samples obtained from a gas supply line 13 through an outlet line 14 to a storage vessel (not shown). The gas supply line 13 is connected through a nipple 15 to the pump 10 as will be explained subsequently, and through a T 16 and nipple 17 to the booster valve 11. This valve alternately provides gas from the supply line 13 through a nipple 18 into the pump 10 and to a bleed outlet port 19. The bleed outlet port 19 is connected through a line 20 to the timing head 12 which in turn controls operation of the booster valve as will be explained subsequently. Alternatively, the booster valve 11 may be triggered from an external pneumatic source, or a three-way solenoid valve may be used in place of the booster valve 11 where the triggering signals are of electrical origin.

Considering the pump 10 more in detail, the same includes a cylinder body 25 which may be made of aluminum. The body has a bore 26 therethrough communicating with a chamber 27 therein. A cylinder bushing 28 is secured within the bore 26, and an injector piston 29 is mounted in the bushing. The bushing 28 and piston 29 preferably are of hardened steel. An O-ring 30 is mounted in an annular groove near the upper end of the piston 29 and performs a valving function which will be described in connection with a discussion of FIGURES 2a and 2b. The interior of the bushing 28 defines a metering chamber 31.

A bore 32 in the body 25 communicates with the metering chamber 31 and has mounted therein a poppet valve 33, preferably formed of the material sold under the name Teflon. An O-ring 34 is provided on this cylindrically shaped valve 33, and this valve is biased downwardly by an adjustment spring 35 and adjustment screw 36. As will be apparent to those skilled in the art, when the poppet valve 33 rises, gas in the metering chamber 31 is exhausted through the outlet line 14 to the storage vessel.

A balancing piston 40, diaphragm 41, and flat washer 42 are all secured onto an adapter 43 positioned on the lower end of the injector piston 29 by means of a piston tie bolt 44. A return spring 45 is mounted between a shoulder 47 in the body 25 and the upper side of the adapter 43. The diaphragm 43 divides the chamber 27 into upper and lower sections, and the periphery of the diaphragm is secured between the lower end of the body 25 and the upper end of a spacer 46. As can be seen, gas supply pressure is supplied through the nipple 15 to the lower chamber below the diaphragm 41, and gas is supplied from the booster 11 through the nipple 18 to the upper chamber above the diaphragm 41.

Turning briefly to the operation of the injector piston 29 and O-ring 30, reference should be made to FIGURES 2a and 2b which illustrate the operation thereof as the piston 29 is moved downward and upward respectively. As seen in FIGURE 2a, the piston 29 includes a small hole 50 communicating with the annular groove 51 in which the O-ring 30 rides. The piston 29 is not tightly fitted within the bushing 28, and as the piston 29 moves downward gas pressure from the chamber above the diaphragm 41 passes through the groove 51 and hole 50 to the metering chamber 31. This occurs during the downward stroke of the piston 29 because the friction between the O-ring and bushing wall causes the ring to shift upward in the groove 51. This exposes the hole 50 to the gas pressure in the chamber above the diaphragm 41 thereby permitting flow into the metering chamber 31 and, thus, the same gas supply pressure exists above and below the diaphragm 41 and in the chamber 31.

When the piston strokes upward, the O-ring 30 shifts downward in the groove 51 as seen in FIGURE 2b, thereby quickly covering the passageway between the periphery of the piston 29 and wall of the bushing 28 and trapping the gas in the metering chamber 31. This arrangement allows the metering chamber 31 to fill to zero differential with supply pressure. As the piston continues its upward stroke, the gas in the metering chamber 31 is compressed to a pressure determined by the downward bias on the poppet valve 33 provided by the adjustment spring 35 and screw 36. This bias force is set to relieve pressure in the metering chamber 31 somewhat above the maximum desired delivery pressure to the discharge outlet line 14. For example, if the desired delivery pressure is one hundred p.s.i., the bias may be one hundred and twenty to one hundred and forty p.s.i. The metering chamber 31 contains gas at supply pressure, and this is compressed by upward movement of the piston 29 ultimately causing the poppet 33 to open.

The arrangement and construction of this poppet valve assembly is such that back pressure in the line 14 has no effect upon the relief point for the metering chamber. The constant relief point holds the corrected volume of residual gas at the top of the stroke of piston 29 constant, thereby maintaining a constant injected volume regardless of back pressure variation. It will be noted that the discharge outlet is at a right angle to the axis of the piston 33, and this prevents back pressure in the line 14 from biasing the piston 33 in any adverse manner since there is no active surface of this piston upon which the back pressure operates. This arrangement is in contradistinction to typical ball check valves which require more pressure to operate as the pressure in the storage vessel is increased.

Gas pressure is constantly supplied through the nipple 15 to the lower chamber below the diaphragm 41. Through operation of the booster valve 11, gas pressure is either supplied to or dumped from the upper chamber above the diaphragm 41 through the nipple 18. With gas pressure in both of the chambers above and below the diaphragm 41, the return spring 45 forces the diaphragm 41 and piston 29 in a downward or retracted position. While in this position, gas pressure is introduced into the metering chamber 31 through the above described O-ring valving function of the O-ring 30. With a pressure differential across the diaphragm 41, the higher pressure in the chamber below this diaphragm overcomes the force of the return spring 45 and forces the diaphragm 41 and piston 29 upward. The piston 29 then compresses the gas in the metering chamber 31, and the compressed gas then opens the poppet 33 and passes out through the discharge line 14.

Considering now the structure and operation of the booster valve 11, the same is a conventional air pilot booster designated HT–100 Booster Valve, and manufactured by Mead Fluid Dynamics. Gas pressure enters an inlet port 60 from the inlet nipple 17 and flows through a connecting channel 61 and restriction 62 to the outlet, or bleed, port 19. As long as there is no restriction on the outlet port, gas pressure is not supplied to outlet port 64 which is connected through the nipple 18 to the pump 10. When a restriction is placed on the outlet port 19, back pressure is exerted on the upper face of a piston 65 and causes this piston and stem 66 to shift downwardly. This action allows gas pressure from the inlet port 60 to flow past the stem 66, and through the outlet port 64 and the nipple 18 to the pump 10. When the restriction in the bleed outlet 19 is removed, pressure on the upper side of the piston 65 is relieved permitting a conical spring 67 to return the stem 66 and piston 65 to their upper position. This causes outlet port 64 to be coupled with a vent outlet 68 thereby allowing gas pressure to be exhausted from the outlet port 64. This allows gas in the chamber above the diaphragm 41 to be exhausted as the pistons 40 and 29 move upwardly. As will be described below, the operation of the booster valve 11 may be controlled by the timing head 12 which controls the restriction in the bleed port 19. Alternatively, the restriction of the bleed port 19 may be controlled by an external pneumatic source as will be described later.

Turning now to a consideration of the timing head 12, the same includes a cap 70 having an upper chamber 71, and diaphragm 72 having its periphery mounted between the upper face of the cap 70 and lower face of the spacer 46. Mounted at the center of the diaphragm 72 are upper and lower diaphragm plates 73 and 74, respectively, which are retained together by screw fasteners and sandwich the central portion of the diaphragm 72. A retaining washer 75 is mounted at the lower end of the chamber 71, and a timing spring 76 is positioned between the lower diaphragm plate 74 and washer 75. A bore 78 and ports 79 and 80 are provided in the cap 70. The port 79 is coupled with the line 20 which is connected to the bleed port 19 of the booster valve 11. A shoulder 81 provides a valve seat for a poppet valve 82, and this valve selectively vents the port 79 to atmosphere through the port 80. A poppet shaft 83 is connected to the poppet valve 82 and extends through the bore 78 in the cap 70 and through a bore 84 in the lower diaphragm plate 74. An O-ring 85 is provided in the cap 70 about the shaft 83. A retaining ring 86 is mounted on the upper end of the shaft 83 and cooperates with a shoulder 87 on the lower plate 74 to raise the poppet valve 82. The poppet valve 82 is lowered when the top face of the shaft 83 is contacted by the under side of the upper diaphragm plate 73. The booster valve 11 provides a valving function as described previously, and is triggered by "dash-pot" actuation of the poppet valve 82 in the timing head 12 as described below. Reference also should be made to FIGURE 3 which illustrates an application of the foregoing apparatus where the line 13 supplies gas at a substantially constant pressure and rate of flow.

With an absence of all supply pressure from the supply pressure from the supply line 13, the return spring 45 forces the moving components of the apparatus to a downward position. This in turn causes the poppet valve 82 to open because the upper face of the shaft 83 is contacted by the upper diaphragm plate 73, thereby creating an unobstructed flow line from the bleed port 19 of the booster valve 11 to atmosphere through the ports 79 and 80 in the timing head 12. When gas pressure is supplied to the lower side of the diaphragm 41 through the supply nipple 15, and to the inlet port 60 of the booster valve 11, the diaphragm 41 and injector piston 29 are forced to an upward or extended position. With the absence of return spring force on the lower diaphragm 72, the timing spring 76 then forces the diaphragm 72 and plates 73–74 upward at a preset rate. This rate is established by the setting of a needle valve 90 which meters the changing gas volume through connecting passageways 91, 92, and 93 of the chambers on the opposite sides of the diaphragm 72. A filter 94 may be provided between the passageways 92 and 93, and a set screw 95 may be provided to securely retain the needle valve 90 in position.

The poppet shaft 83 is not directly connected to the diaphragm 72, and therefore remains in a downward open position until the shoulder 87 of the lower diaphragm plate 74 contacts the retaining ring 86 and pulls the poppet upward to close the same against the seat 81. This obstructs the bleed line flow from the booster valve 11 thereby causing it to actuate as explained earlier and supply gas to the chamber above the diaphragm 41. With the pressure balanced across the diaphragm 41, the return spring 45 rapidly strokes the diaphragm 41 and injector piston 29 downward until contact is made by the nut 44 with the top of the upper diaphragm plate 73. This tends to compress the gas in chamber 71 below the lower diaphragm 72, thereby building up a pressure differential across this diaphragm. Stroke speed from this point thus is slowed because of the necessity of metering the gas volume under the lower diaphragm 72 through the needle valve 90 to the chamber above the diaphragm 72. The speed of operation of the pump 10 can therefore be controlled by changing the setting of the needle valve 90; for example, a greater restriction causes the pump to operate slower. The poppet valve 82 remains in the closed position until the lower side of the upper diaphragm plate 73 contacts the top face of the poppet shaft 83 and forces the poppet 82 open. This allows the pressure from the bleed line of the booster valve 11 to exhaust to atmosphere through the ports 79 and 80, thereby again actuating the booster valve 11 to exhaust pressure from the chamber above the diaphragm 41 through the nipple 18, booster valve 11 and vent outlet 68 as explained earlier. The piston 29 then strokes up, and the complete cycle as described above is repeated.

The "dash-pot" timing head provides a pressure bias effect on the poppet 82 and shaft 83. It can be seen that the smaller effective area of the poppet shaft 83 than the sealing area of the poppet valve 82 provides an unbalanced condition. This provides the following feature. Assume that the poppet valve 82 is in the closed position with the diaphragm 72 and plates 73–74 being forced down by action of the return spring 45. When the upper plate 73 contacts the top face of the poppet shaft 83 and partially opens the poppet, the pressure tending to hold the poppet closed is exhausted to atomsphere through ports 79 and 80. However pressure is still present at the top face of the poppet shaft 83 and thereby produces a force which shoves the poppet 82 and shaft 83 downward to a fully extended position. The injector piston 29 then strokes upwardly, and the timing spring 76 starts moving the diaphragm 72, plates 73–74, shaft 83 and poppet 82 upwardly. When the poppet 82 is sufficiently near the seat 81 to start a build-up of back pressure in the bleed line 20, a force is produced across the poppet 82 which overcomes the opposing force against the top face of the shaft 83. This force firmly seats the poppet 82 and maintains it seated until it is mechanically forced from the seat 81 by the upper plate 73 engaging the top face of the shaft 83. The foregoing arrangement provides a "snap-acting" type of operation for the poppet 82.

Turning now to modifications of the above apparatus, FIGURE 4 illustrates a simplified form thereof wherein the timing head 12 is replaced by a cap 96. A set screw 97 is threaded into the lower end of the cap 96 to limit the downward stroke of the piston 29. The set screw 97 is secured by a nut 98. This assembly is employed in place of the timing head 12 for sampling applications where external triggering is used as schematically illustrated in FIGURES 5 through 7 and which are described below.

FIGURE 5 schematically illustrates a sampling application for the modified apparatus employed in conjunction with a conventional positive displacement gas meter 100. In this application the gas pressure in the line 13 varies, and venting of the bleed line 20 of the booster valve 11 is caused to be proportional to meter rotation. For example, the meter 100 may include apparatus 101 therein comprising a plate having a plurality of apertures and driven by rotation of the meter, the line 20 being connected to a nozzle contiguous with the plate. In this manner, the booster 11 is triggered in time with movement of the meter. The pump 10 thus strokes in synchronism with meter operation, and the density of the charge in the metering chamber 31 is the same as the gas that passes through the meter.

FIGURE 6 illustrates an application employing a conventional integrating orifice meter 102 which meters gas flowing across an orifice plate 103. Preferably, a regulator 104 is provided to regulate the gas supplied to the sampling apparatus. The meter 102 operates as a flow computer and causes rotation of an internal counter which indicates a corrected rate of gas flow through the orifice 103. Again a perforated plate and nozzle may be used in conjunction with the bleed line 20 to trigger the booster valve 11. Through the use of the regulator 104, it is not necessary to provide the O-ring valving function within the pump 10 because the gas supply is regulated with respect to meter operation. A similar arrangement is shown in FIGURE 7 also employing an integrating orifice meter 105, but in this instance the meter 105 has a switch 106 which operates as a function of counter rotation rather than using a perforated disc and nozzle. Furthermore, a booster valve 11 is not needed, and a solenoid valve 107 is used instead. The solenoid valve is a conventional three-way electrically operated valve which performs the same function as the booster valve 11.

What is claimed is:
1. Gas sampling apparatus comprising
    pump means for receiving gas from a gas supply and injecting metered quantities thereof into a storage vessel, said pump means comprising a body having first and second inlet ports and an outlet port, and having a cylinder communicating with a chamber, said inlet ports communicating with said chamber and said cylinder communicating with said outlet port, a piston mounted in said cylinder for forcing gas from said chamber to said outlet port, a bypass valve for controlling gas flow to said outlet port as a function of gas pressure in said cylinder, a diaphragm mounted in said chamber of said body and defining sections of said chamber which respectively communicate with said first and second input ports,
    supply means adapted to couple said gas supply to said first inlet port and to selectively supply gas to said second inlet port, and
    timing head means coupled with said body and said supply means for controlling the operation of said supply means, said timing head means including valve means responsive to retraction of said piston for causing said supply means to pass gas to said second inlet port.

2. Apparatus as in claim 1 wherein
    said timing head means includes a diaphragm member and a poppet valve member mounted centrally with respect to said diaphragm member, and includes a variable restriction passageway across said diaphragm member.

3. Apparatus as in claim 2 wherein
    said supply means includes a pneumatic valve having an inlet port adapted to be coupled with said gas supply, an outlet port coupled with the second inlet port of said pump means, and a bleed port coupled with said timing head means.

4. Apparatus as in claim 1 wherein said timing head means includes a cap member affixed to the body of said pump means, said cap member having a diaphragm member therein defining a chamber in said timing head means and separating the same from the section of said chamber of said pump means which communicates with said first inlet of said pump means, a resilient member normally biasing said diaphragm member toward said piston of said pump means, said valve means of said timing head means comprising a poppet valve cooperating with said diaphragm member, and a variable restriction passageway across said diaphragm member.

5. Gas sampling apparatus comprising pump means for receiving gas from a gas supply and injecting metered quantities thereof into a storage vessel, said pump means comprising a body having a piston therein and a first diaphragm means coupled to control the operation of said piston, and timing head means coupled with said pump means for supplying periodic signals to effect pneumatic control of said first diaphragm means, said timing head means comprising a second diaphragm means and valve member therein responsive to retraction of said piston for opening and closing said valve member, and a variable restriction passageway across said second diaphragm means.

6. Gas sampling apparatus as in claim 5 wherein said pump means includes a chamber divided by said first diaphragm means into first and second sections, said first section being adapted to be coupled to said gas supply, and said second section being adapted to periodically receive gas from said gas supply, and said second diaphragm means including a diaphragm member and a resilient member normally biasing said diaphragm member toward said piston, said valve member being mounted coaxially with respect to said diaphragm member and responsive to movement of said diaphragm member for opening and closing a valve port in said timing head means.

7. Gas sampling apparatus as in claim 6 including supply means having an inlet adapted to be coupled to said gas supply, an outlet coupled to the second section of the chamber of said pump means, and a signal input coupled with said valve port in said timing head means for receiving control signals from said valve member to control passage of gas to said outlet of said supply means.

References Cited

UNITED STATES PATENTS

| 2,091,613 | 8/1937 | Polston | 73—422 |
| 2,452,143 | 10/1948 | Pellettere | 73—421.5 |
| 3,090,323 | 5/1963 | Smith | 73—422 |

S. CLEMENT SWISHER, Primary Examiner

U.S. Cl. XR.

73—422